United States Patent
Shibutani et al.

(10) Patent No.: US 9,139,675 B2
(45) Date of Patent: Sep. 22, 2015

(54) POLYVINYL ACETAL-BASED RESIN

(75) Inventors: Mitsuo Shibutani, Osaka (JP); Masahiro Saito, Osaka (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 529 days.

(21) Appl. No.: 12/225,972

(22) PCT Filed: Apr. 4, 2007

(86) PCT No.: PCT/JP2007/057586
§ 371 (c)(1),
(2), (4) Date: Oct. 3, 2008

(87) PCT Pub. No.: WO2007/114472
PCT Pub. Date: Oct. 11, 2007

(65) Prior Publication Data
US 2009/0093609 A1 Apr. 9, 2009

(30) Foreign Application Priority Data
Apr. 5, 2006 (JP) .................................. 2006-103977

(51) Int. Cl.
C08F 8/00 (2006.01)
C08F 216/38 (2006.01)

(52) U.S. Cl.
CPC ........... *C08F 216/38* (2013.01); *C08F 2800/10* (2013.01)

(58) Field of Classification Search
CPC ................ C08F 8/00; C08F 8/12; C08F 8/28; C08F 16/06; C08F 216/38; C08F 218/08
USPC .................................................... 525/56, 61
See application file for complete search history.

(56) References Cited

U.S. PATENT DOCUMENTS

| | | | |
|---|---|---|---|
| 2,518,440 A * | 8/1950 | Joyce, Jr. ................... | 525/327.2 |
| 2004/0024137 A1* | 2/2004 | Kusudou et al. ........... | 525/330.3 |
| 2005/0129656 A1* | 6/2005 | Goupil et al. ............. | 424/78.31 |

FOREIGN PATENT DOCUMENTS

| | | | |
|---|---|---|---|
| CN | 1495205 | 5/2004 | |
| JP | 5-295016 | 11/1993 | |
| JP | 9-071443 | 3/1997 | |
| JP | 10-158328 | 6/1998 | |
| JP | 2000-313721 | 11/2000 | |
| JP | 2002-284818 | 10/2002 | |
| JP | 2003-183325 | 7/2003 | |
| JP | 2004-285143 | 10/2004 | |
| JP | 2004285143 | * 10/2004 | ................ C08F 8/12 |
| JP | 2006-104309 | 4/2006 | |

OTHER PUBLICATIONS

Chinese Office Action issued in Chinese Application No. 200780012208.3, mailed Mar. 10, 2010, with a full English translation—12 pages.

* cited by examiner

*Primary Examiner* — David W Wu
*Assistant Examiner* — Marie Reddick
(74) *Attorney, Agent, or Firm* — Hamre, Schumann, Mueller & Larson, P.C.

(57) ABSTRACT

The present invention provides a polyvinyl acetal-based resin which has a high elastic modulus, is excellent in solubility to an alcoholic solvent, and gives a highly transparent alcohol solution. The polyvinyl acetal-based resin is obtained by acetalizing a polyvinyl alcohol-based resin (A) which has 0.1 to 1.5% by mol of a 1,2-diol structural unit represented by the following general formula (1) and a degree of saponification of 98.5% by mol or more:

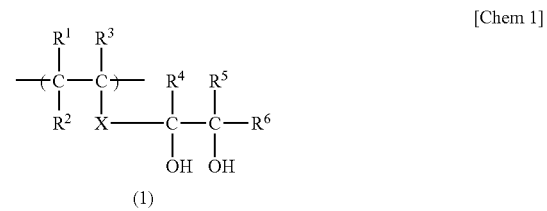

(1)

wherein $R^1$, $R^2$, and $R^3$ each independently represents a hydrogen atom or an organic group; X represents a single bond or a bonding chain; and $R^4$, $R^5$, and $R^6$ each independently represents a hydrogen atom or an organic group.

8 Claims, No Drawings

POLYVINYL ACETAL-BASED RESIN

TECHNICAL FIELD

The present invention relates to a polyvinyl acetal-based resin. More specifically, the invention relates to a polyvinyl acetal-based resin which has a high elastic modulus, is excellent in solubility to an alcoholic single solvent, and gives a highly transparent alcohol solution.

BACKGROUND ART

A polyvinyl acetal-based resin is generally obtained by acetalizing a polyvinyl alcohol-based resin (hereinafter, polyvinyl alcohol is abbreviated as PVA) obtained by saponification of a polyvinyl ester-based resin and is a polymer having a structural unit wherein a continuous vinyl alcohol structural unit of the PVA-based resin is acetalized with an aldehyde compound, an unreacted vinyl alcohol structural unit, and a vinyl acetate structural unit which is an unsaponified part of the PVA-based resin. Since such a polyvinyl acetal-based resin is excellent in toughness, dispersibility of inorganic and organic powders, adhesiveness to various materials, and transparency and is soluble in many organic solvents, the resin is used in a variety of use applications, e.g., a paint such as a wash primer, a protective paint, and a metallic paint, a printing ink such as a flexographic ink and s gravure ink, a printed board, a varnish for a coil wire, an adhesive, a ceramic binder, s binder for a magnetic tape and the like, an ink-jet medium, s coating material for textile printing, a glass intermediate film, and the like.

Such a polyvinyl acetal-based resin is frequently used as an organic solvent solution. However, recently, from the viewpoint of environmental protection, it is requested to reduce an amount of the organic solvent to be used and, also for the polyvinyl acetal-based resin, the use as a solution having a higher concentration is required. Therefore, a polyvinyl acetal-based resin showing a low solution viscosity when it is made into a solution having a high concentration, is desired and, for example, there has been proposed a polyvinyl acetal-based resin obtained by acetalizing a PVA-based resin having ethylene as a constitutional unit in a main chain (see e.g., Patent Document 1).

Moreover, as the organic solvent in the case where the polyvinyl acetal-based resin is used as a solution, a mixed solvent of an aromatic-based solvent such as toluene or xylene and an alcoholic solvent has preferably been used because a solution having a low viscosity and showing a small change in viscosity during storage is obtained. However, since the aromatic-based solvent becomes a large burden to the environment and has a large influence on health, the use thereof tends to be limited and it is desired that the polyvinyl acetal-based resin solution would be a solution with an alcoholic single solvent.

However, a usual polyvinyl acetal-based resin has an insufficient solubility to the alcoholic single solvent. For example, the polyvinyl acetal-based resin described in Patent Document 1 shows a good solubility to an aromatic-based/alcoholic mixed solvent solution but the solubility thereof to the alcoholic single solvent is insufficient.

On the other hand, a hydroxyl group in an unreacted vinyl alcohol structural unit derived from a PVA-based resin as a material largely influences a property of the polyvinyl acetal-based resin. The larger amount of the hydroxyl group the resin has, the more easily the resin crystallizes through a hydrogen bond to give a polyvinyl acetal-based resin excellent in high elastic modulus and toughness. Therefore, the polyvinyl acetal-based resin obtained from, as a material, a PVA-based resin having a high degree of saponification, i.e., a large amount of the hydroxyl group, is used in use applications where a high elastic modulus and toughness are required, such as a film, a coated film, and a glass intermediate film.

However, the polyvinyl acetal-based resin derived from such a PVA-based resin having a high degree of saponification has an insufficient solubility to an alcoholic single solvent in some cases and, even when dissolved, only a solution having a low transparency is obtained, so that it is difficult to apply the resin to a film or the like where transparency is required.

Patent Document 1: JP-A-2003-183325

DISCLOSURE OF THE INVENTION

Problems that the Invention is to Solve

The present inventors have already proposed a polyvinyl acetal-based resin obtained by acetalizing a PVA-based resin having a 1,2-diol structure in a side chain as a polyvinyl acetal-based resin excellent in solubility to an alcoholic single solvent (Japanese Patent Application No. 2004-292098). However, another object of such a novel polyvinyl acetal-based resin is improvement in flexibility, so that all the polyvinyl acetal-based resins evaluated in the study have low elastic modulus and thus are not suitable for use applications such as a film and a glass intermediate film. Furthermore, it has been found that such a novel polyvinyl acetal-based resin still has room for improvement in transparency when made into an alcohol single solvent solution.

Namely, an object of the invention is to provide a polyvinyl acetal-based resin which has a high elastic modulus, is excellent in solubility to an alcoholic single solvent, and gives a highly transparent alcohol solution.

Means for Solving the Problems

As a result of extensive studies in consideration of the above circumstances, the present inventors have found that the object of the invention is achieved by the following constitution and thus have accomplished the invention.

[1] A polyvinyl acetal-based resin, wherein the polyvinyl acetal-based resin is obtained by acetalizing a polyvinyl alcohol-based resin (A) having 0.1 to 1.5% by mol of a 1,2-diol structural unit represented by the following general formula (1) and a degree of saponification of 95% by mol or more:

[Chem 1]

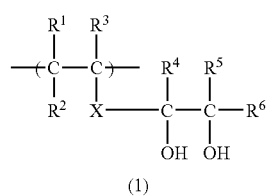

(1)

wherein $R^1$, $R^2$, and $R^3$ each independently represents a hydrogen atom or an organic group; X represents a single bond or a bonding chain; and $R^4$, $R^5$, and $R^6$ each independently represents a hydrogen atom or an organic group.

[2] The polyvinyl acetal-based resin according to the above [1], wherein all of $R^1$, $R^2$, and $R^3$ are hydrogen, X is a single bond, and all of $R^4$, $R^5$, and $R^6$ are hydrogen in the general formula (1).

[3] The polyvinyl acetal-based resin according to the above [1] or [2], wherein the polyvinyl alcohol-based resin (A) is obtained by saponifying a copolymer of a vinyl ester-based monomer with a compound represented by the general formula (2):

[Chem 2]

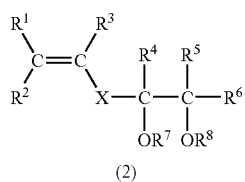

(2)

wherein $R^1$, $R^2$, and $R^3$ each independently represents hydrogen or an organic group; X represents a single bond or a bonding chain; $R^4$, $R^5$, and $R^6$ each independently represents a hydrogen atom or an organic group; and $R^7$ and $R^8$ each independently represents a hydrogen atom or $R^9$—CO— where $R^9$ is an alkyl group.

[4] The polyvinyl acetal-based resin according to any one of the above [1] to [3], wherein a degree of acetalization is 40 to 80% by mol.

[5] The polyvinyl acetal-based resin according to any one of the above [1] to [4], which is obtained by acetalization with butyraldehyde.

Namely, the invention is most characterized in that a modified PVA having a 1,2-diol structural unit represented by the general formula (1) in a side chain, especially one having a relatively small content of the 1,2-diol structural unit and a high degree of saponification is used as the PVA-based resin which is a material for the polyvinyl acetal-based resin. Thereby, there are obtained advantages characteristic to the invention, i.e., a high elastic modulus and an excellent solubility to an alcoholic solvent.

Usually, in the case of obtaining a polyvinyl acetal-based resin having a high elastic modulus, the PVA-based resin as a material preferably has a high degree of saponification but, with regard to alcohol solubility, the resin having a low degree of saponification is desirable. Thus, it is presumed that, by introducing the 1,2-diol structure capable of remarkably improving the alcohol solubility even in a small amount into the side chain, a high elastic modulus owing to the use of the PVA-based resin having a high degree of saponification and excellent alcohol solubility owing to the modifying group can be both achieved.

Moreover, the polyvinyl acetal-based resin is usually produced by acetalizing at a low temperature a PVA-based resin made into an aqueous solution but, in the case of a PVA-based resin having a high degree of saponification, a micro junction is apt to form in an aqueous solution and there is a possibility that they may inhibit homogeneous acetalization. It is presumed that the PVA-based resin (A) to be used in the invention, however, hardly forms a micro junction in a low-temperature aqueous solution even when the resin has a high degree of saponification and allows homogeneous acetalization to proceed and thereby a polyvinyl acetal-based resin having characteristics of the invention is obtained.

Advantage of the Invention

Since the polyvinyl acetal-based-resin of the invention has a high elastic modulus, is excellent in solubility to an alcoholic single solvent, and gives a highly transparent alcohol solution, it is extremely suitable for use applications where a high elastic modulus and toughness are required, such as a film, a coated film, and a glass intermediate film, and use applications where a solvent solution is cast and dried to form a transparent film.

The advantages of the invention are obtained by the use of the PVA-based resin (A) having a 1,2-diol structure in a side chain as a material.

On the other hand, there is known a PVA-based resin wherein a main bonding mode of the PVA main chain is a 1,3-glycol bond but the amount of a main-chain 1,2-glycol bond is larger than the usual value (about 1.6% by mol), which is obtained by increasing a ratio of a head-head bond or tail-tail bond by elevating a polymerization temperature for polyvinyl acetate as compared with the temperature usually employed (e.g., JP-2001-355175 etc.). However, such main-chain 1,2-glycol bond exhibits a small effect of lowering crystallinity unlike a side-chain 1,2-diol structure of the PVA-based resin (A) to be used in the invention, so that an effect of suppressing the formation of a micro junction in a low-temperature aqueous solution cannot be expected so much. Moreover, the hydroxyl group derived from such main-chain 1,2-glycol bond is a secondary hydroxyl group the same as the usual PVA-based resin and thus a high elastic modulus attributable to a strong hydrogen bond and intermolecular cohesive force such as a primary hydroxyl group in the side-chain 1,2-diol structure of the invention cannot be expected.

Moreover, a PVA-based resin having a monohydroxyalkyl group in a side chain, which is obtained by copolymerization of an α-olefin having a hydroxyl group at a terminal, is also known (e.g., JP-A-7-179707 etc.). However, a PVA-based resin having a high degree of polymerization is hardly obtained with the monomer used in such a technology in many cases and is insufficient for the use as a material for the polyvinyl acetal-based resin wherein film strength is required.

BEST MODE FOR CARRYING OUT THE INVENTION

The explanation of the constitutional-requirements described below is one example (representative example) of embodiments of the present invention and the invention is not specified to these contents.

The following will explain the invention in detail.

The polyvinyl acetal-based resin of the invention is obtained by acetalizing a PVA-based resin (A) having a 1,2-diol structural unit represented by the following general formula (1).

[Chem 3]

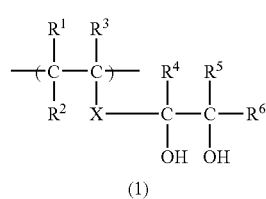

(1)

wherein $R^1$, $R^2$, and $R^3$ each independently represents a hydrogen atom or an organic group; X represents a single bond or a bonding chain; and $R^4$, $R^5$, and $R^6$ each independently represents a hydrogen atom or an organic group.

Namely, the polyvinyl acetal-based resin of the invention is a polymer having a structural unit wherein a continuous vinyl alcohol structural unit of the PVA-based resin (A) is acetalized with an aldehyde compound, a structural unit wherein the 1,2-diol part in the structural unit represented by the general formula (1) is acetalized, an unreacted vinyl alcohol structural unit, an unreacted structural unit represented by the general formula (1), and a vinyl acetate structural unit which is an unsaponified part of the PVA-based resin.

The following will explain the PVA-based resin (A) to be used as a material for the polyvinyl acetal-based resin of the invention.

The PVA-based resin (A) to be used in the invention is a PVA-based resin having a 1,2-diol structural unit represented by the following general formula (1). In the general formula (1), $R^1$, $R^2$, and $R^3$ each independently represents a hydrogen atom or an organic group, X represents a single bond, i.e., direct bond of a carbon in the vinyl structural part and a carbon in the 1,2-diol structural part, or a bonding chain, and $R^4$, $R^5$, and $R^6$ each independently represents a hydrogen atom or an organic group.

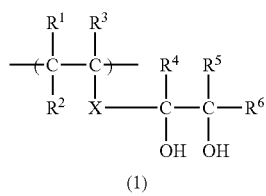

(1)

A content of the 1,2-diol structural unit represented by the general formula (1) in such a PVA-based resin (A) is 0.1 to 1.5% by mol and a remaining part of the PVA-based resin (A) contains a vinyl alcohol structural unit and a small amount of vinyl acetate structural unit same as in the case of usual PVA-based resins.

All of $R^1$ to $R^3$ and $R^4$ to $R^6$ in the 1,2-diol structural unit represented by the general formula (1) are desirably a hydrogen atom but $R^1$ to $R^3$ and $R^4$ to $R^6$ may be an organic group so far as the amount thereof is an amount which does not remarkably impair the resin property. The organic group is not particularly limited but is preferably an alkyl group having 1 to 4 carbon atoms, such as a methyl group, an ethyl group, an n-propyl group, an isopropyl group, an n-butyl group, an isobutyl group, or a tert-butyl group, and the alkyl group having 1 to 4 carbon atoms may have a substituent group such as a halogen group, a hydroxyl group, an ester group, a carboxylic acid group, or a sulfonic acid group, as necessary.

Moreover, X in the 1,2-diol structural unit represented by the general formula (1) is preferably a single bond, i.e., direct bond of a carbon in the vinyl structural part and a carbon in the 1,2-diol structural part but may be a bonding chain so far as it falls within the range where an advantages of the invention is not inhibited. Such a bonding chain is not particularly limited but includes hydrocarbons such as alkylene, alkenylene, alkynylene, phenylene, and naphthylene (these hydrocarbons may be substituted with halogen or the like such as fluorine, chlorine, or bromine) as well as —O—, —(CH$_2$O)$_m$—, —(OCH$_2$)$_m$—, —(CH$_2$O)$_m$CH$_2$—, —CO—, —COCO—, —CO(CH$_2$)$_m$CO—, —CO(C$_6$H$_4$)CO—, —S—, —CS—, —SO—, —SO$_2$—, —NR—, —CONR—, —NRCO—, —CSNR—, —NRCS—, —NRNR—, —HPO$_4$—, —Si(OR)$_2$—, —OSi(OR)$_2$—, —OSi(OR)$_2$O—, —Ti(OR)$_2$—, —OTi(OR)$_2$—, —OTi(OR)$_2$O—, —Al(OR)—, —OAl(OR)—, OAl(OR)O—, and the like (R is each independently an arbitrary substituent group, preferably a hydrogen atom or an alkyl group and m is a natural number). Of these, in view of stability at production or at use, an alkylene group having 6 or less carbon atoms or —CH$_2$OCH$_2$— is preferred.

The process for producing the PVA-based resin (A) to be used in the invention is not particularly limited but (i) a process of saponification of a copolymer of a vinyl ester-based monomer with a compound represented by the following general formula (2) is suitably employed.

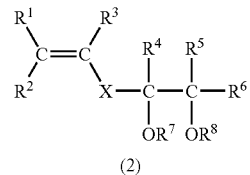

(2)

wherein $R^1$, $R^2$, and $R^3$ each independently represents hydrogen or an organic group; X represents a single bond or a bonding chain; $R^4$, $R^5$, and $R^6$ each independently represents a hydrogen atom or an organic group; and $R^7$ and $R^8$ each independently represents a hydrogen atom or $R^9$—CO— where $R^9$ is an alkyl group.

Moreover, as processes other than (i), (ii) a process of saponification and decarboxylation of a copolymer of a vinyl ester-based monomer with a compound represented by the following general formula (3):

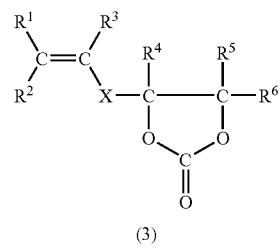

(3)

wherein $R^1$, $R^2$, and $R^3$ each independently represents a hydrogen atom or an organic group; X represents a single bond or a bonding chain; and $R^4$, $R^5$, and $R^6$ each independently represents a hydrogen atom or an organic group, and (iii) a process of saponification and solvolysis of ketal structure of a copolymer of a vinyl ester-based monomer with a compound represented by the following general formula (4) may be employed.

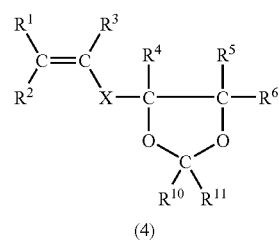

(4)

wherein $R^1$, $R^2$, and $R^3$ each independently represents a hydrogen atom or an organic group; X represents a single bond or a bonding chain; $R^4$, $R^5$, and $R^6$ each independently represents a hydrogen atom or an organic group; and $R^{10}$ and $R^{11}$ each independently represents a hydrogen atom or an organic group.

As the vinyl ester-based monomers to be used in the invention, there may be mentioned vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, vinyl versatate, and the like. Among them, vinyl acetate is preferably used from an economic viewpoint.

The following will describe the processes (i), (ii), and (iii).
[Process of (i)]

The process of (i) is a process for producing a PVA-based resin having a 1,2-diol structural unit represented by the above general formula (1) by copolymerization of a vinyl ester-based monomer with a compound represented by the above general formula (2), followed by saponification.

In the compound represented by the above general formula (2), $R^1$ to $R^3$, $R^4$ to $R^6$, and X are as those in the above general formula (1) and $R^7$ and $R^8$ each independently is a hydrogen atom or $R^9$—CO— where $R^9$ is an alkyl group, preferably a methyl group, a propyl group, a butyl group, a hexyl group, or an octyl group and such an alkyl group may have a substituent group such as a halogen group, a hydroxyl group, an ester group, a carboxylic acid group, or a sulfonic acid group within the range where copolymerization reactivity and subsequent steps are not adversely affected.

As the compound represented by the formula (2), there may be mentioned 3,4-dihydroxy-1-butene, 3,4-diacyloxy-1-butene, 3-acyloxy-4-hydroxy-1-butene, 4-acyloxy-3-hydroxy-1-butene, 3,4-diacyloxy-2-methyl-1-butene which are cases where X is specifically a single bond; 4,5-dihydroxy-1-pentene, 4,5-diacyloxy-1-pentene, 4,5-dihydroxy-3-methyl-1-pentene, 4,5-diacyloxy-3-methyl-1-pentene, 5,6-dihydroxy-1-hexene, 5,6-diacyloxy-1-hexene which are cases where X is an alkylene group; glycerin monoallyl ether, 2,3-diacetoxy-1-allyloxypropane, 2-acetoxy-1-allyloxy-3-hydroxypropane, 3-acetoxy-1-allyloxy-2-hydroxypropane, glycerin monovinyl ether, glycerin monoisopropenyl ether which are cases where X is —$CH_2OCH_2$— or —$OCH_2$—; and the like.

Among them, in view of excellency in copolymerization reactivity and industrial handling, 3,4-diacyloxy-1-butene which is a case where $R^1$, $R^2$, $R^3$, $R^4$, $R^5$, and $R^6$ are hydrogen, X is a single bond, $R^7$ and $R^8$ are $R^9$—CO—, and $R^9$ is an alkyl group is preferred. Of these, particularly, 3,4-diacetoxy-1-butene which is a case where $R^9$ is a methyl group is preferably used.

When vinyl acetate is used as a vinyl ester-based monomer and it is copolymerized with 3,4-diacetoxy-1-butene, reactivity ratios of individual monomers are as follows: r(vinyl acetate)=0.710, r(3,4-diacetoxy-1-butene)=0.701, which shows that 3,4-diacetoxy-1-butene is excellent in copolymerization reactivity with vinyl acetate as compared with the case of vinylethylene carbonate to be described later: r(vinyl acetate)=0.85, r(vinylethylene carbonate)=5.4.

Moreover, a chain transfer constant Cx of 3,4-diacetoxy-1-butene is 0.003 (65° C.), which is a small value as compared with Cx=0.005 (65° C.) in the case of vinylethylene carbonate and Cx=0.023 (65° C.) in the case of 2,2-dimethyl-4-vinyl-1,3-dioxolane. This fact indicates that increase in a degree of polymerization is hardly inhibited in the case where 3,4-diacetoxy-1-butene is used as a comonomer of the vinyl ester-based monomer as compared with the other monomers. Moreover, 3,4-diacetoxy-1-butene is excellent also in view of polymerization rate as compared with the above other monomers.

Moreover, with regard to such 3,4-diacetoxy-1-butene, it is also an industrially large advantage that a by-product generated at the time when the copolymer is saponified is an acetic acid derivative similar to the vinyl acetate structural unit that is a main structural unit and it is not necessary to provide a special apparatus and step for post-treatment thereof.

Incidentally, 3,4-diacetoxy-1-butene can be commercially available as products from Eastman Chemical Company for industrial production and from Acros on a reagent level. Moreover, 3,4-diacetoxy-1-butene obtained as a by-product during a production process for 1,4-butanediol can be purified and utilized. Also, 1,4-diacetoxy-2-butene can be converted into 3,4-diacetoxy-1-butene by a known isomerization reaction using palladium chloride catalyst or the like and it can be used.

At the copolymerization of such a vinyl ester-based monomer with the compound represented by the general formula (2), any known method including bulk polymerization, solution polymerization, suspension polymerization, dispersion polymerization, or emulsion polymerization can be adopted without limitation but usually, the solution polymerization is performed.

An adding method of the monomer components at the copolymerization is not particularly limited and an arbitrary method such as adding all at once, adding divisionally, or adding continuously may be adopted. In view of homogeneous distribution of the 1,2-diol structural unit derived from the compound represented by the general formula (2) in a molecular chain of the polyvinyl ester-based polymer, dropping polymerization is preferred and particularly, a polymerization method based on a HANNA method using the aforementioned reactivity ratio with vinyl acetate is preferred.

As a solvent to be used in such copolymerization, there may be usually mentioned lower alcohols such as methanol, ethanol, isopropyl alcohol, n-propanol, and butanol; ketones such as acetone and methyl ethyl ketone; and the like. Industrially, methanol is suitably employed.

An amount of the solvent to be used may be suitably selected in consideration of the chain transfer constant of the solvent according to the degree of polymerization of the target copolymer and, for example, when the solvent is methanol, the amount is selected from the range of S (solvent)/M (monomer)=0.01 to 10 (weight ratio), preferably about 0.05 to 3 (weight ratio).

At the copolymerization, a polymerization catalyst is used and, as such a polymerization catalyst, there may be mentioned known radical polymerization catalysts such as azobisisobutyronitrile, acetyl peroxide, benzoyl peroxide, and lauryl peroxide; low-temperature active radical polymerization catalysts such as azobisdimethylvaleronitrile and azobismethoxydimethylvaleronitrile; and the like. An amount of the polymerization catalyst to be used varies depending on the kind of the comonomer and the kind of the catalyst and is not categorically determined but is arbitrarily selected depending on polymerization rate. For example, in the case of using azoisobutyronitrile and acetyl peroxide, it is preferably 0.01 to 0.7% by mol, particularly 0.02 to 0.5% by mol based on the vinyl ester-based monomer.

Moreover, with regard to a reaction temperature of the copolymerization reaction, the reaction is carried out in the range of 30° C. to about a boiling point depending on the solvent and pressure to be used, more specifically 35 to 150° C., and preferably 40 to 75° C.

At the completion of the polymerization, a known polymerization inhibitor to be used at radical polymerization is preferably added into a reaction system, and as such a polymerization inhibitor, there may be, for example, mentioned m-dinitrobenzene, ascorbic acid, benzoquinone, dimer of α-methylstyrene, p-methoxyphenol, and the like.

The resulting copolymer is then saponified, and at such saponification, the copolymer obtained in the above is dissolved in a solvent such as an alcohol and the saponification is carried out using an alkali catalyst or an acid catalyst. As representative solvents, there may be mentioned methanol, ethanol, propanol, tert-butanol, and the like, and methanol is particularly preferably used. A concentration of the copolymer in the alcohol is suitably selected depending on a viscosity of the system and is usually selected from the range of 10 to 60% by weight. As the catalyst to be used for saponification, there may be mentioned alkali catalysts including alkali metal hydroxides and alcoholates such as sodium hydroxide, potassium hydroxide, sodium methylate, sodium ethylate, potassium methylate, and lithium methylate; and acid catalysts such as sulfuric acid, hydrochloric acid, nitric acid, methasulfonic acid, zeolite, and cation-exchange resins.

An amount of such a saponification catalyst to be used is suitably selected depending on the saponification method, objective degree of saponification, and the like but in the case of using an alkali catalyst, a ratio of 0.1 to 30 mmol, preferably 2 to 17 mmol based on 1 mol of the total amount of the 1,2-diol structural unit derived from the vinyl ester-based monomer and compound represented by the formula (2) is suitable.

Moreover, the reaction temperature of the saponification reaction is not particularly limited but is preferably 10 to 60° C., more preferably 20 to 50° C.

Moreover, a glycerin monoallyl ether which is a case where X is —$CH_2OCH_2$— and $R^1$, $R^2$, $R^3$, $R^4$, $R^5$, and $R^6$ are hydrogen is also a preferred monomer as the compound represented by the formula (2) but it is difficult to obtain a PVA-based resin having a high degree of polymerization as compared with the case of 3,4-diacetoxy-1-butene or the like and thus it is rather unsuitable for the material for a polyvinyl acetal-based resin where film strength is required.

[Process of (ii)]

The process of (ii) is a process for producing a PVA-based resin having a 1,2-diol structural unit represented by the above general formula (1) by copolymerizing a vinyl ester-based monomer with a compound represented by the above general formula (3), followed by saponification and decarboxylation.

In the compound represented by the above general formula (3) to be used in the invention, $R^1$ to $R^3$, $R^4$ to $R^6$, and X are as those in the above general formula (1). Of these, in view of easy availability and good copolymerizability, vinylethylene carbonate which is a case where $R^1$, $R^2$, $R^3$, $R^4$, $R^6$, and $R^6$ are hydrogen and X is a single bond is suitably used.

At the copolymerization of the vinyl ester-based monomer with the compound represented by the general formula (3) and saponification, they are carried out in a similar manner to the above process of (i).

With regard to decarboxylation, the decarboxylation is performed along with saponification without particular treatment and ring-opening of the ethylene carbonate ring induces transformation into the 1,2-diol structure.

Moreover, it is possible to perform decarboxylation without saponification of a vinyl ester part under a constant pressure (normal pressure to $1 \times 10^7$ Pa) and under a high temperature (50 to 200° C.). In such a case, it is also possible to carry out the above saponification after decarboxylation.

In the case of using vinylethylene carbonate, dimethyl carbonate that is a toxic compound is produced as a by-product at the time when the copolymer with the vinyl ester-based monomer is saponified, so that it is necessary to pay attention on the time of production, treatment of a recovered solvent, a remainder in products, or the like.

[Process of (iii)]

The process of (iii) is a process for producing a PVA-based resin having a 1,2-diol structural unit represented by the above general formula (1) by copolymerization of a vinyl ester-based monomer with a compound represented by the above general formula (4), followed by saponification and solvolysis of ketal structure.

In the compound represented by the above general formula (4) to be used in the invention, $R^1$ to $R^3$, $R^4$ to $R^6$, and X are as those in the above general formula (1) and $R^{10}$ and $R^{11}$ each independently is hydrogen or an alkyl group, and the alkyl group is not particularly limited but is preferably an alkyl group having 1 to 4 carbon atoms such as a methyl group, an ethyl group, an n-propyl group, an isopropyl group, an n-butyl group, an isobutyl group, or a tert-butyl group. Such an alkyl group may have a substituent group such as a halogen group, a hydroxyl group, an ester group, a carboxylic acid group, or a sulfonic acid group within the range where copolymerization reactivity and the like are not adversely affected. Of these, in view of easy availability and good copolymerizability, 2,2-dimethyl-4-vinyl-1,3-dioxolane which is a case where $R^1$, $R^2$, $R^3$, $R^4$, $R^5$, and $R^6$ are hydrogen and $R^{10}$ and $R^{11}$ are a methyl group is suitable.

At the copolymerization of the vinyl ester-based monomer with the compound represented by the general formula (4) and saponification, they are carried out in a similar manner to the above process of (i).

With regard to solvolysis of ketal structure, in the case where the saponification reaction is carried out using an alkali catalyst, after the saponification, solvolysis of ketal structure is further carried out using an acid catalyst in an aqueous solvent (water, water/acetone, a lower alcohol-mixed solvent such as water/methanol, or the like) to achieve transformation into the 1,2-diol structure. As the acid catalyst in that case, there may be mentioned acetic acid, hydrochloric acid, sulfuric acid, nitric acid, methasulfonic acid, zeolite, and cation-exchange resins.

Moreover, in the case where the saponification reaction is carried out using an acid catalyst, solvolysis of ketal structure is carried out along with the saponification without particular treatment to achieve transformation into the 1,2-diol structure.

As mentioned above, since 2,2-dimethyl-4-vinyl-1,3-dioxolane has a large chain transfer constant as compared with 3,4-diacetoxy-1-butene or the like, it is difficult to obtain a PVA-based resin having a high degree of polymerization, and thus it is rather unsuitable for the material for a polyvinyl acetal-based resin where film strength is required.

Moreover, as the PVA-based resin (A) to be used in the invention, one obtained by copolymerization with any of various unsaturated monomers can be employed within the range where the object of the invention is not inhibited. An amount of such an unsaturated monomer to be introduced is not categorically determined but a too much amount thereof may impair water solubility and lower a gas-barrier property, so that the case is not preferred.

As such an unsaturated monomer, there may be, for example, mentioned olefins such as ethylene, propylene, isobutylene, α-octene, α-dodecene, and α-octadecene; hydroxyl group-containing α-olefins such as 3-buten-1-ol, 4-penten-1-ol, and 5-hexen-1-ol; unsaturated acids such as acrylic acid, methacrylic acid, crotonic acid, maleic acid, maleic anhydride, and itaconic acid and salts, monoesters, or dialkyl esters thereof; nitriles such as acrylonitrile and methacrylonitrile; amides such as diacetoneacrylamide, acrylamide, and methacrylamide; olefinsulfonic acids such as ethylenesulfonic acid, allylsulfonic acid, and methallylsulfonic acid or salts thereof; vinyl compounds such as alkyl vinyl ethers, dimethylallyl vinyl ketone, N-vinylpyrrolidone, and vinyl chloride; substituted vinyl acetates such as isopropenyl acetate and 1-methoxyvinyl acetate; vinylidene chloride, 1,4-diacetoxy-2-butene, vinylene carbonate, acetoacetyl group-containing monomers, and the like.

Furthermore, there may be also mentioned polyoxyalkylene group-containing monomers such as polyoxyethylene (meth)allyl ether, polyoxyethylene(meth)acrylamide, polyoxypropylene(meth)acrylamide, polyoxyethylene(meth)acrylate, polyoxypropylene(meth)acrylate, polyoxyethylene(1-(meth)acrylamide-1,1-dimethylpropyl)ester, polyoxyethylene vinyl ether, polyoxypropylene vinyl ether, polyoxyethyleneallylamine, polyoxypropyleneallylamine, polyoxyethylenevinylamine, and polyoxypropylenevinylamine; cationic group-containing monomers such as N-acrylamidomethyltrimethylammonium chloride, N-acrylamidoethyltrimethylammonium chloride, N-acrylamidopropyltrimethylammonium chloride, 2-acryloxyethyltrimethylammonium chloride, 2-methacryloxyethyltrimethylammonium chloride, 2-hydroxy-3-methacryloyloxypropyltrimethylammonium chloride, allyltrimethylammonium chloride, methallyltrimethylammonium chloride, 3-butenetrimethylammonium chloride, dimethyldiallylammonium chloride, and diethyldiallylammonium chloride; and the like.

Also, by elevating the polymerization temperature to 100° C. or higher, it is possible to use one wherein a 1,2-diol bond that is a heterogeneous bond is introduced into a PVA main chain in an amount of about 1.6 to 3.5% by mol.

A content of the 1,2-diol structural unit represented by the general formula (1) in the thus obtained PVA-based resin (A) is 0.1 to 1.5% by mol, and one having the content of 0.2 to 1.2% by mol, particularly 0.3 to 1% by mol is preferred. When the content of the 1,2-diol structural unit is too small, transparency of an alcohol solution may be insufficient and viscosity stability during long-term storage may decrease in some cases. Contrarily, when the content is too large, the elastic modulus of the polyvinyl acetal-based resin may be too low in some cases. Thus, the cases are not preferred. The reason may be presumably as follows: when the PVA-based resin as a material is made into an aqueous solution, there is a case where the solution is apparently a homogeneous aqueous solution but a micro junction owing to molecular association is formed at a molecular level and when acetalization reaction is carried out in such a state, the degree of acetalization becomes heterogeneous intermolecularly or intramolecularly.

On the other hand, when the content of the 1,2-diol structural unit is too large, the elastic modulus of the resulting polyvinyl acetal-based resin may decrease and thus it may become difficult to apply it to the use applications where high rigidity and toughness are required, so that the case is not preferred.

Moreover, a degree of saponification of the PVA-based resin (A) is 95% by mol or more, preferably 96 to 99.9% by mol, further 97 to 99.8% by mol, and particularly 99.0 to 99.5% by mol. When the degree of saponification is too low, the elastic modulus of the resulting polyvinyl acetal-based resin may be sometimes insufficient, so that the case is not preferred.

Furthermore, an average degree of polymerization (measured in accordance with JIS K6726) of the PVA-based resin (A) is usually 100 to 4,000, and further preferably 200 to 3,500, particularly preferably 250 to 3,000. When the average degree of polymerization is too small, the strength of the resulting polyvinyl acetal-based resin is insufficient. Contrarily, when the degree is too large, the viscosity of a solution of the polyvinyl acetal-based resin becomes too high, so that workability decreases and it becomes difficult to form a solution having a high concentration. Thus, the cases are not preferred.

Additionally, the PVA-based resin (A) to be used in the invention may be a mixture with the other different PVA-based resin. As the other PVA-based resin, there may be mentioned those having a different content of the 1,2-diol structural unit represented by the general formula (1), those having a different degree of saponification, those having a different degree of polymerization, those containing a copolymerization component different from the aforementioned other copolymerization components, and the like.

The following will explain a process for producing the polyvinyl acetal-based resin of the invention.

The process for producing the polyvinyl acetal-based resin of the invention is not particularly limited and any of known processes can be employed. Particularly, preferably used is a process wherein the above PVA-based resin (A) is acetalized with an aldehyde compound in a solvent in the presence of an acid catalyst. The process is roughly classified into a precipitation process and a dissolution process. In the case of the former (precipitation process), there is preferably used a process wherein the PVA-based resin (A) is made into an aqueous solution, an acetalization reaction is carried out at a low temperature in a solvent mainly containing water, and after precipitation of the polyvinyl acetal-based resin, an aging reaction (completion of the acetalization reaction and realignment of acetalized parts) is carried out by elevating the system temperature. Moreover, in the latter (dissolution process), using an alcoholic solvent such as isopropyl alcohol or a mixed solvent in which water or the like is used in combination, an acetalization reaction is carried out at a high temperature and then the polyvinyl acetal-based resin is precipitated by adding water or the like to the system.

The aldehyde compound to be used in the above acetalization reaction is not particularly limited and there may be, for example, mentioned aliphatic aldehydes such as formaldehyde (including trimeric and polymeric paraformaldehyde), acetaldehyde (including trimeric paraacetaldehyde), propionaldehyde, butyraldehyde, isobutyraldehyde, pentylaldehyde, isopentylaldehyde, hexylaldehyde, 2-ethylhexylaldehyde, and cyclohexylaldehyde; aliphatic dialdehydes such as glyoxal, succindialdehyde, and glutardialdehyde; aromatic aldehydes such as benzaldehyde, o-tolaldehyde, p-tolaldehyde, m-tolaldehyde, p-hydroxybenzaldehyde, salicylaldehyde; and heterocyclic aldehydes such as furfural. Of these, acetaldehyde and butyraldehyde are suitably used and particularly, butyraldehyde is suitably used. Moreover, these aldehydes may be used singly or two or more aldehydes may be used as a mixture.

The acid catalyst to be used in the acetalization reaction is not particularly limited but there may be, for example, mentioned organic acids such as acetic acid, and para-toluenesulfonic acid, and inorganic acids such as hydrochloric acid, sulfuric acid, and nitric acid, and preferably, hydrochloric acid or sulfuric acid is used.

Moreover, after completion of the acetalization reaction, it is possible to add an alkaline compound such as sodium hydroxide, potassium hydroxide, ammonia, sodium acetate, sodium carbonate, sodium hydrogen carbonate, or potassium carbonate, an alkylene oxide such as ethylene oxide, or glycidyl ethers such as ethylene glycol diglycidyl ether.

A degree of acetalization of the polyvinyl acetal-based resin of the invention is not particularly limited but is preferably 40 to 80% by mol, particularly 50 to 80% by mol, and further 60 to 75% by mol. When the degree of acetalization is too small, the resin becomes water-soluble. Therefore, it becomes difficult to isolate the polyvinyl acetal-based resin from the reaction system in any production process of the precipitation process and the dissolution process or hydrophilicity of the polyvinyl acetal-based resin increases and thus water resistance becomes insufficient, so that the case is not preferred. Moreover, when the degree is too large, the remaining hydroxyl group decreases. Therefore, toughness of the polyvinyl acetal-based resin becomes insufficient or solubility thereof to an alcoholic single solvent becomes poor in some cases, so that the case is not preferred.

In the polyvinyl acetal-based resin of the invention, there is a case where both of a hydroxyl group in a main chain of the PVA-based resin (A) and a hydroxyl group in the 1,2-diol structure in a side chain may be acetalized in some cases. In that case, the degree of acetalization is represented by an amount of the acetalized hydroxyl group based on a total amount of the hydroxyl group before acetalization.

Since the thus obtained polyvinyl acetal-based resin of the invention uses a PVA-based resin having the 1,2-diol structure in a side chain as a material, the polyvinyl acetal-based resin has an unreacted 1,2-diol structural unit in a molecular chain and exhibits a high elastic modulus and an excellent solubility to an alcoholic solvent owing to the effect thereof.

Furthermore, with regard to the polyvinyl acetal-based resin of the invention, since formation of a micro junction of the PVA-based resin is little at the acetalization reaction of the PVA-based resin in low-temperature water, a homogeneous acetalized product is obtained and it is presumed that intermolecular or intramolecular acetalization distribution is homogeneous. As a result, in the case where it is used as a binder for a paint, a ceramic, a thermally developable photosensitive material, and the like, a good adhesiveness is obtained. Moreover, in the case of the use as a glass intermediate film, it is presumed that insufficient melt adhesion hardly occurs in any case of pressure/heat adhesion by autoclave and adhesion by a vacuum bag method.

EXAMPLES

The following will explain the invention with reference to Examples and the invention is not limited to the description of Examples unless it exceeds the gist.

In Examples, "part(s)" and "%" means weight based ones unless otherwise stated.

Example 1

Production of PVA-Based Resin (A)

Into a reaction vessel fitted with a reflux condenser, a dropping funnel, and a stirrer were added 1200 g of vinyl acetate, 240 g of methanol, and 12 g of 3,4-diacetoxy-1-butene (0.5% by mol based on vinyl acetate), and azobisisobutyronitrile was added in an amount of 0.017% by mol (based on added vinyl acetate). Under stirring, a temperature was elevated under a nitrogen stream and polymerization was carried out under reflux.

At the time when polymerization ratio of vinyl acetate reached 74.5%, 0.3 g of m-dinitrobenzene was added to terminate the polymerization and an unreacted vinyl acetate monomer was removed outside of the system by a method of introducing methanol vapor therein, thereby a methanol solution of a copolymer being obtained.

Then, the solution was diluted with methanol to adjust the concentration to 35% and added into a kneader. While the solution temperature was maintained at 40° C., a 2% methanol solution of sodium hydroxide was added in such a ratio that the amount thereof became 8 mmol based on 1 mol of the total amount of vinyl acetate structural unit and 3,4-diacetoxy-1-butene structural unit in the copolymer and saponification was performed. As the saponification proceeds, a saponified product was precipitated and, at the time when it became a particle form, it was filtrated, thoroughly washed with methanol, and dried in a hot-air drier to obtain a PVA-based resin (A1).

A degree of saponification of the resulting PVA-based resin (A1) was found to be 99.3% by mol when analyzed based on an alkali consumption amount required for hydrolysis of remaining vinyl acetate and 3,4-diacetoxy-1-butene. When analyzed in accordance with JIS K6726, an average degree of polymerization was found to be 1850. Moreover, a content of the 1,2-diol structure was found to be 0.4% by mol upon $^1$H-NMR measurement and calculation. For the NMR measurement, "AVANCE DPX400" manufactured by Bruker Japan Co., Ltd. was used.

[Production of Polyvinyl Acetal]

After 18 g of the PVA-based resin (A1) was added into a beaker in which 284 g of water is present, stirred, and dispersed, the temperature was elevated to 90° C. and the resin was dissolved over a period of 1.5 hours.

The resulting aqueous PVA-based resin (A1) solution was adjusted at a concentration of 5% and 250 g of a portion thereof was cooled to 10° C. Thereto were added 1.3 g of hydrochloric acid having a concentration of 35% and 7.45 g of n-butyraldehyde, and an acetalization reaction was carried out with maintaining the liquid temperature at 10° C. to precipitate a reaction product. Then, the liquid temperature was maintained at 25° C. for 30 minutes and at 40° C. for 5 hours to complete the reaction and, by common procedure, neutralization, washing with water, and drying were performed to obtain a polyvinyl acetal-based resin. A degree of acetalization of the polyvinyl acetal-based resin on $^1$H-NMR was found to be 69.8% by mol.

[Transparency of Alcohol Solution]

The resulting polyvinyl acetal-based resin was made into a 4% solution in methanol or ethanol and light transmittance (%) was determined at 25° C. at 430 nm using a spectrophotometer (ultraviolet visible spectrophotometer V-560 manufactured by JASCO Corporation).

[Storage Elastic Modulus]

A 10% ethanol solution of such a polyvinyl acetal-based resin was cast on a glass plate and dried to prepare a film having a thickness of 10 μm. A viscoelasticity of the film was measured under conditions of a relative humidity of 40% RH, a frequency of 10 Hz, and a temperature of 30 to 90° C. (temperature-elevating rate of 0.5° C./minute) using a humidity-controlled viscoelasticity-measuring apparatus (DVA-225 Rheometer manufactured by IT Keisoku Seigyo Co., Ltd.) and a storage modulus at 45° C. was determined based on the resulting date.

Example 2

A polyvinyl acetal-based resin (degree of acetalization of 66.7% by mol) was prepared in the same manner as in Example 1 except that temperature elevation to 80 to 85° C. and 1.5 hours were employed as the dissolution conditions of the PVA-based resin in the production step of the polyvinyl acetal-based resin of Example 1, and transparency of the alcohol solution was similarly evaluated. The results are shown in Table 1.

Example 3

A polyvinyl acetal-based resin (degree of acetalization of 62.4% by mol) was prepared in the same manner as in Example 1 except that temperature elevation to 90° C. and 1.5 hours and further temperature elevation to 120° C. in an autoclave and 1 hour were employed as the dissolution conditions of the PVA-based resin in the production step of the polyvinyl acetal-based resin of Example 1, and transparency of the alcohol solution was similarly evaluated. The results are shown in Table 1.

Comparative Example 1

A polyvinyl acetal-based resin (degree of acetalization of 67.4% by mol) was prepared in the same manner as in Example 1 except that PVA consisting of a vinyl alcohol structural unit and a vinyl acetate unit and having a degree of saponification of 99.0% by mol and an average degree of polymerization of 1750 was used as the PVA-based resin in Example 1, and evaluation was similarly performed. The evaluation results are shown in Table 1.

Comparative Example 2

A polyvinyl acetal-based resin (degree of acetalization of 65.2% by mol) was prepared in the same manner as in Comparative Example 1 except that temperature elevation to 80 to 85° C. and 1.5 hours were employed as the dissolution conditions of the PVA-based resin in Comparative Example 1, and transparency of the alcohol solution was similarly evaluated. The results are shown in Table 1.

Comparative Example 3

A polyvinyl acetal-based resin (degree of acetalization of 65.8% by mol) was prepared in the same manner as in Comparative Example 1 except that temperature elevation to 90° C. and 1.5 hours and further temperature elevation to 120° C. in an autoclave and 1 hour were employed as the dissolution conditions of the PVA-based resin in Comparative Example 1, and transparency of the alcohol solution was similarly evaluated. The results are shown in Table 1.

Comparative Example 4

A polyvinyl acetal-based resin (degree of acetalization of 69% by mol) was prepared in the same manner as in Example 1 using a PVA-based resin (content of 1,2-diol structure of 6.1% by mol, degree of saponification of 99% by mol, average degree of polymerization of 860) prepared in accordance with the production step of the PVA-based resin (A) in Example 1, and evaluation was similarly performed. The results are shown in Table 1.

Comparative Example 5

A polyvinyl acetal-based resin (degree of acetalization of 64% by mol) was prepared in the same manner as in Example 1 using an ethylene-modified PVA, as the PVA-based resin, having an ethylene content of 6%, a degree of saponification of 98% by mol, and an average degree of polymerization of 1700 obtained by saponification of a copolymer of ethylene with vinyl acetate in Example 1, and evaluation was similarly performed. The results are shown in Table 1.

TABLE 1

| | Dissolution Conditions of PVA | Transparency of alcohol solution (%) | | Storage modulus (Pa) |
|---|---|---|---|---|
| | | Methanol | Ethanol | |
| Example 1 | 90° C. × 1.5 hr | 98.6 | 93.6 | $2.0 \times 10^9$ |
| Example 2 | 80 to 85° C. × 1.5 hr | 98.1 | 71.2 | — |
| Example 3 | 90° C. × 1.5 hr + 120° C. × 1 hr | 98.7 | 93.6 | — |
| Comparative Example 1 | 90° C. × 1.5 hr | 94.0 | 54.3 | $1.9 \times 10^9$ |
| Comparative Example 2 | 80 to 85° C. × 1.5 hr | 95.6 | * | — |
| Comparative Example 3 | 90° C. × 1.5 hr + 120° C. × 1 hr | 94.5 | 66.8 | — |
| Comparative Example 4 | 90° C. × 1.5 hr | 90.9 | 71.3 | $1.4 \times 10^9$ |
| Comparative Example 5 | 90° C. × 1.5 hr | ** | ** | $1.5 \times 10^9$ |

* undissolved gel is present
** impossible to measure because of white turbidity As is apparent in Table 1, the polyvinyl acetal-based resins of the invention (Examples 1 to 3) are excellent in solubility to methanol and ethanol and give alcohol solutions excellent in transparency as compared with the polyvinyl acetal-based resins using unmodified PVA as a material (Comparative Examples 1 to 3). Particularly, it is found that the polyvinyl acetal-based resins of the invention give good alcohol solubility and transparency even when dissolution of PVA at production is conducted at low temperature.

Moreover, the polyvinyl acetal-based resins of the invention have a high elastic modulus and give a high transparency when made into an alcohol solution as compared with one using the PVA-based resin having a large content of the 1,2-diol structure (Comparative Example 4).

While the invention has been described in detail and with reference to specific embodiments thereof, it will be apparent to one skilled in the art that various changes and modifications can be made therein without departing from the spirit and scope thereof.

The present application is based on Japanese Patent Application No. 2006-103977 filed on Apr. 5, 2006, and the contents are incorporated herein by reference.

INDUSTRIAL APPLICABILITY

Since the polyvinyl acetal-based resin of the invention has a high elastic modulus, is excellent in solubility to an alcoholic solvent, and gives a transparent alcohol solution, it is extremely suitable for use applications where a high elastic modulus and toughness are required, such as a film, a coated film, and a glass intermediate film, and use applications where a solvent solution is cast and dried to form a transparent film.

The invention claimed is:

1. A polyvinyl acetal-based resin comprising an acetalized resin of a polyvinyl alcohol-based resin (A) comprising 0.4 to 1.2 mol % of a 1,2-diol structural unit in a side chain represented by following formula (1) and saponified to a degree of 95 mol % or higher:

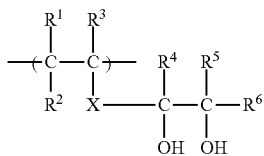

(1)

wherein each of $R^1$, $R^2$, $R^3$, $R^4$, $R^5$, and $R^6$ independently represents a hydrogen atom or an organic group, and X represents a single bond or a bonding chain, and the polyvinyl alcohol-based resin (A) is acetalized to a degree of 60 to 80 mol %.

2. The polyvinyl acetal-based resin according to claim 1, wherein all of $R^1$, $R^2$, $R^3$, $R^4$, $R^5$, and $R^6$ are a hydrogen atom, and X is a single bond in the formula (1).

3. The polyvinyl acetal-based resin according to claim 1, wherein the polyvinyl alcohol-based resin (A) is a saponified copolymer of a vinyl ester-based monomer with a compound represented by following formula (2):

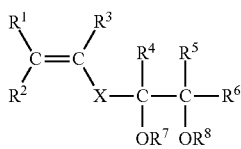

(2)

wherein each of $R^1$, $R^2$, $R^3$, $R^4$, $R^5$, and $R^6$ independently represents a hydrogen atom or an organic group; X represents a single bond or a bonding chain; and each of $R^7$ and $R^8$ independently represents a hydrogen atom or $R^9$—CO— where $R^9$ is an alkyl group.

4. The polyvinyl acetal-based resin according to claim 1, wherein the polyvinyl alcohol-based resin (A) is acetalized with butyraldehyde.

5. The polyvinyl acetal-based resin according to claim 1, wherein the organic group for $R^1$, $R^2$, $R^3$, $R^4$, $R^5$, and $R^6$ is an alkyl group having 1 to 4 carbon atoms, wherein one or more hydrogen atoms of the alkyl group are optionally substituted with at least one group independently selected from the group consisting of a halogen group, a hydroxyl group, an ester group, a carboxylic acid group, and a sulfonic acid group.

6. The polyvinyl acetal-based resin according to claim 1, wherein the polyvinyl alcohol-based resin (A) has an average polymerization degree in a range from 100 to 4,000 when measured according to JIS K6726.

7. The polyvinyl acetal-based resin according to claim 1, wherein elastic modulus of the polyvinyl acetal-based resin is higher than elastic modulus of a polyvinyl acetal-based resin having no 1,2-diol structural unit in a side chain.

8. The polyvinyl acetal-based resin according to claim 1, wherein the polyvinyl acetal-based resin is soluble in alcohol, and the polyvinyl acetal-based resin has stable storage viscosity.

\* \* \* \* \*